INVENTORS
KESAHARU KASUGA,
TAKEO ABE,
TSUNEHIRO HAGA
BY
Stevens, Davis, Miller & Mosher
ATTORNEYS July 17, 1973  KESAHARU KASUGA ET AL  3,746,525
COOLING FINS
Filed July 14, 1971  2 Sheets-Sheet 2
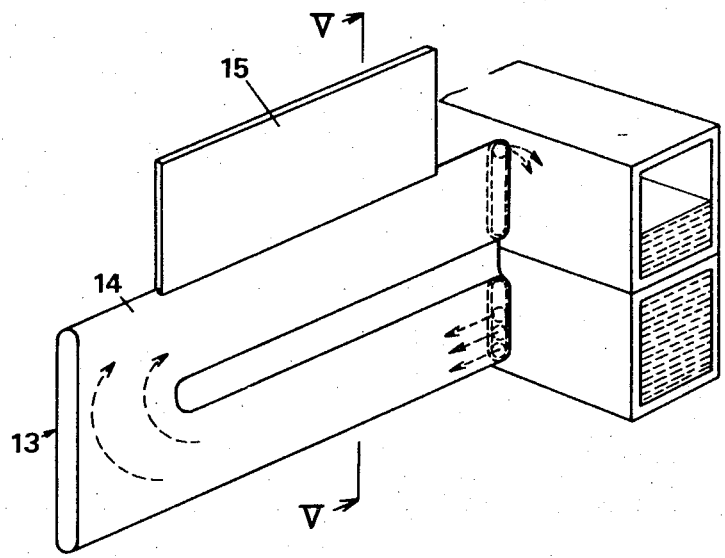
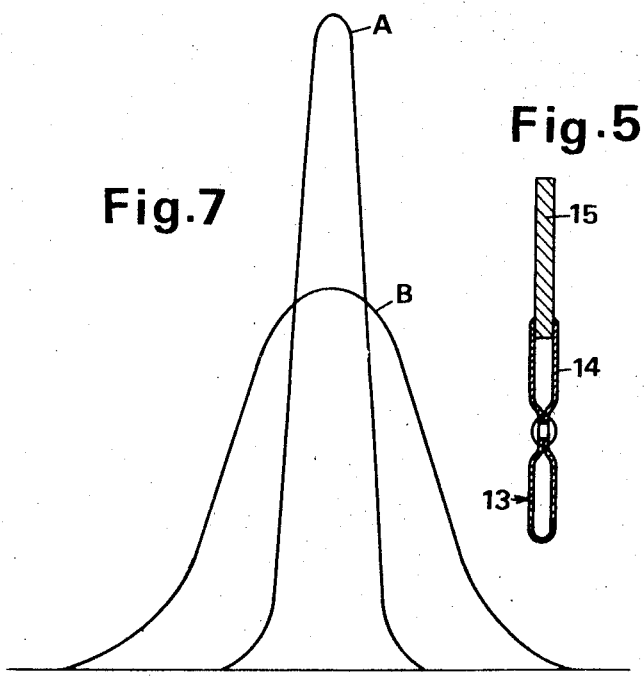
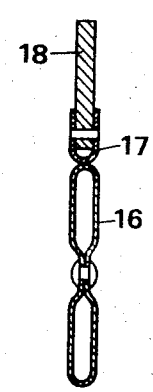
INVENTORS
KESAHARU KASUGA,
TAKEO ABE,
TSUNEHIRO HAGA
BY
Stevens, Davis, Miller & Mosher
ATTORNEYS United States Patent Office 3,746,525
Patented July 17, 1973

3,746,525
COOLING FINS
Kesaharu Kasuga, Tokyo, and Takeo Abe and Tsunehiro Haga, Koriyama, Japan, assignors to Paramount Glass Mfg. Co., Ltd., Koriyama, Fukushima-ken, Japan
Filed July 14, 1971, Ser. No. 162,563
Claims priority, application Japan, July 16, 1970, 45/62,409
Int. Cl. F03b 17/00, 37/00
U.S. Cl. 65—12                    6 Claims

ABSTRACT OF THE DISCLOSURE

An improved cooling fin for use in proximity to multi-orifice bushing plates for the production of glass filaments comprising a body having therein a U-shaped conduit for a liquid coolant, the lower leg being open for inlet of coolant, the upper leg provided at its outer end with a closure having a drain hole in the upper portion thereof, and an intermediate section connecting the upper and lower legs. The fin is formed of a heat-resisting metal of good thermal conductivity and the conduit preferably has a cross-section in the form of a narrow or flattened ellipse. To increase the heat absorption effect, the upper leg may be provided with a vertical extension, or fin piece, of solid metal. The lower leg and the upper leg are adapted for connection to a coolant supply and a coolant outlet respectively.

---

This invention relates to cooling means which are designed for installations in close proximity to the filament-forming orifices of bushings used for producing primary glass filaments in the manufacture of glass fibers or glass wool.

In such continuous operations it is necessary to cool the molten glass cone under the bushing plate rapidly by cooling fins in order to form cones suitable to drawing good quality filaments. However, the amount of heat to be absorbed by the cooling fin is so large that the conventional cooling fins structure are unable to handle the load and thus are unsatisfactory for mass production operations.

It is an object of this invention to provide a cooling means of simple design with adequate capacity to absorb and remove the heat in the vicinity of the orifice tips during the production of the glass filaments continuously on an industrial scale.

That and other objects will be apparent from the following description and the accompanying drawings in which:

FIG. 4 is a perspective view, partly in section, of another embodiment of the invention;

FIG. 5 is a sectional view taken on the line V—V of FIG. 4;

FIG. 6 is a sectional view of another form of the fin shown in FIG. 4; and

FIG. 7 is a glass fiber diameter distribution curve.

Figure 1:
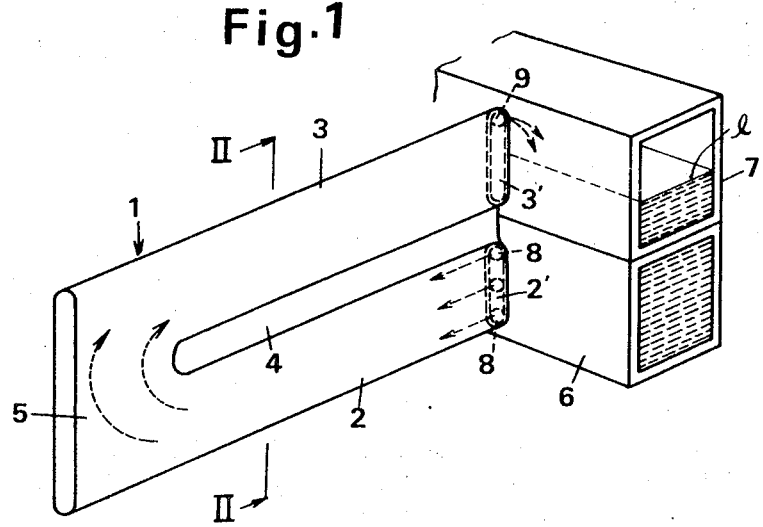
FIG. 1 is a perspective view, partly in section, of one embodiment of the invention.
Figure 2:
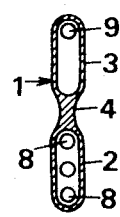
FIG. 2 is the sectional view of FIG. 1 taken on the line II—II.

In cooling fin of FIG. 1, fine 1, formed from a good thermal conductivity metal, is connected to the water inlet tube 2 positioned at the bottom and to the water outlet tube 3 positioned at the top which are separated by the solid section 4 in a top and bottom parallel arrangement, these tubes being connected at the fin tip 5.

The water inlet section 2 and the water outlet section 3 are connected, respectively, at their bases 2' and 3' to water inlet tube 6 and water outlet tube 7, which are preferably of equal cross section. Tubes 6 and 7 may be square, as shown, or of other cross-sectional confiuration as desired. The water inlet tube 6 is kept filled with water at lower pressure which flows through holes 8 in base 2' into section 2 to maintain the required amount of water therein.

The water outlet tube 7 is positioned above the water inlet tube 6 and is provided with a water draining hole 9 at the top part of base 3' opening into tube 7, in which the water level is adjusted so that the water level is always below the said draining hole 9.

Figure 3:
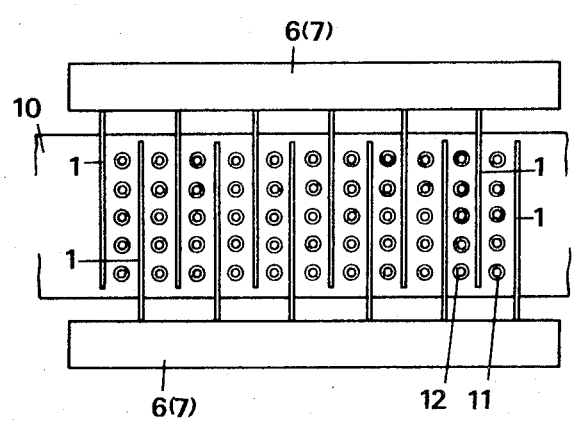
FIG. 3 shows a bushing plate and its filament-forming orifices provided with cooling fins according to the invention.

While FIG. 1 shows a single fin 1 connecting tubes 6 and 7, it will be understood that in the usual application there will be a plurality of such fins, as indicated in FIG. 3.

FIG. 3 is a plan view of a typical bushing 10, having a number of filament-forming orifice groups represented by numerals 11 and 12. Between these groups there are placed cooling fins 1 connected, alternately, to water tubes 6, 7, on either side of the bushing 10.

When the molten glass flows out from the orifice groups 11, 12, it assumes a cone shape from the combined effects of the glass viscosity, surface tension and the pulling strength applied to the filament, as described in more detail in U.S. application Serial No. 163,578, filed July 19, 1971.

When the cooling fin of this invention is placed in the requisite proximity to the cones extending from the orifices in the bushing plate the water or other liquid coolant will flow through the inlet holes 8 into the inlet section 2 and thence through the tip 5 to outlet section 3, draining substantially continuously through the draining hole 9 into the discharge tube 7. During this flow the liquid will absorb heat through the metal satisfactorily. It will be seen that in this embodiment each cooling fin will be kept full of coolant at all times so that there is a substantive heat absorption which is about the same for each of the fins. Thus. There is effected a uniform cooling around the orifices at a very high efficiency. Further the structure is very simple so that manufacture and installation are facilitated.

Because of the good cooling efficiency of the embodiment described above, it will be satisfactory in most installations. For special situations, however, a modified form of the invention as shown in FIG. 4, may be more suitable. In this embodiment of the invention, there is provided a fin piece extending upwardly of cooling tube 3. This fin piece serves to absorb additional heat and also to restrict air flow in the immediate vicinity of the adjacent orifices, which is desirable under some operating conditions.

FIGS. 4 and 5 show a fin piece 15 of metal or like heat-resistive and thermal-conductive material extending upwardly from the water outlet section 14 of cooling fin 13 and when installed as in FIG. 3, this fin piece 15 will be in close proximity to certain of the orifices and the said fin piece 15 will transmit absorbed heat through the water outlet section 14.

FIG. 6 shows another construction in which a U-shaped channel 17 is provided above the edge of water outlet section 16 to secure the fin piece 18. This form has substantially the same cooling capacity as that of FIG. 5. In these embodiments the cooling fin 15 or 18 may be made of a high thermal conductive material or of a smaller thermal conductive material depending upon the required cooling effect.

In FIG. 7, curve A shows the filament diameter distribution of the primary filaments produced in apparatus incorporating cooling fins according to this invention in comparison to the filament diameter distribution curve B for filaments produced similarly but using conventional cooling means. With the cooling fins of this invention, the atmosphere under the orifices is maintained under substantially stable conditions so as to maintain the cooling effect on the molten glass which is required to minimize filament diameter variation in the several filaments produced from a single bushing. In comparison, without such controlled cooling, the balance between the molten glass weight and surface tension will be unstable resulting in pulsations of the molten glass cone from which the filament is drawn. Because of such pulsations there are substantial variations lengthwise in the diameter of the resulting filament.

It will be understood that the foregoing disclosure relates to preferred embodiments of the invention and that various modifications may be made therein without departing from the spirit and scope of the invention as set forth in the appended claims.

What is claimed is:

1. A cooling device for making glass fiber comprising an elongated, relatively thin body of heat-conductive material, said body having a channel therein for flow of a liquid coolant therethrough, said channel being U-shaped with an inlet section in the lower leg and an outlet section in the upper leg, an inlet tube connected to said inlet section for supplying a liquid coolant thereto, a liquid drain hole of lesser cross-section than said outlet section provided at the top of said outlet section for maintaining a predetermined level of liquid in said upper section, and an outlet tube connected with said outlet section for withdrawing effluent therefrom, whereby the water level in said outlet tube is always below said drain hole.

2. The cooling device of claim 1 wherein the outlet section has a fin-shaped piece extending upwardly therefrom.

3. An apparatus for producing glass fibers comprising a bushing, orifices within said bushing, an elongated relatively thin body of heat-conductive material positioned between said orifices, said body having a channel therein for flow of a liquid coolant therethrough, said channel being U-shaped with an inlet section in the lower leg and an outlet section in the upper leg, an inlet tube connected to said inlet section for supplying a liquid coolant thereto, a liquid drain hole of lesser cross-section than said outlet section provided at the top of said outlet section for maintaining a predetermined level of liquid in said upper section, and an outlet tube connected with said outlet section for withdrawing effluent therefrom, whereby the water level in said outlet tube is always below said drain hole.

4. The apparatus of claim 3 wherein the upper and lower legs are spaced apart by a web of the heat-conductive material and the legs are connected at the tip of the device.

5. The apparatus of claim 3 wherein the outlet section has a fin-shaped piece extending upwardly therefrom.

6. The apparatus of claim 5 wherein the lower edge of the fin-shaped piece extends into the upper leg.

References Cited

UNITED STATES PATENTS

| | | | |
|---|---|---|---|
| 1,907,527 | 5/1933 | Erskine | 165—176 X |
| 1,829,387 | 10/1931 | Arnold | 165—171 X |
| 3,251,665 | 5/1966 | Bour | 65—12 X |
| 3,284,180 | 11/1966 | Stalego | 65—12 |
| 3,305,011 | 2/1967 | Smith, Jr. | 165—183 X |
| 3,279,535 | 10/1966 | Huet | 165—183 |

FOREIGN PATENTS

| | | | |
|---|---|---|---|
| 803,917 | 11/1958 | Great Britain | 165—183 |

A. W. DAVIS, Jr., Primary Examiner

U.S. Cl. X.R.

165—171, 176, 183, 174; 425—379